April 23, 1940. G. E. CAMPBELL 2,198,301
WATER CYLINDER LINER RETAINER AND PACKING GLAND FOR PUMPS
Filed Oct. 14, 1937 3 Sheets-Sheet 3
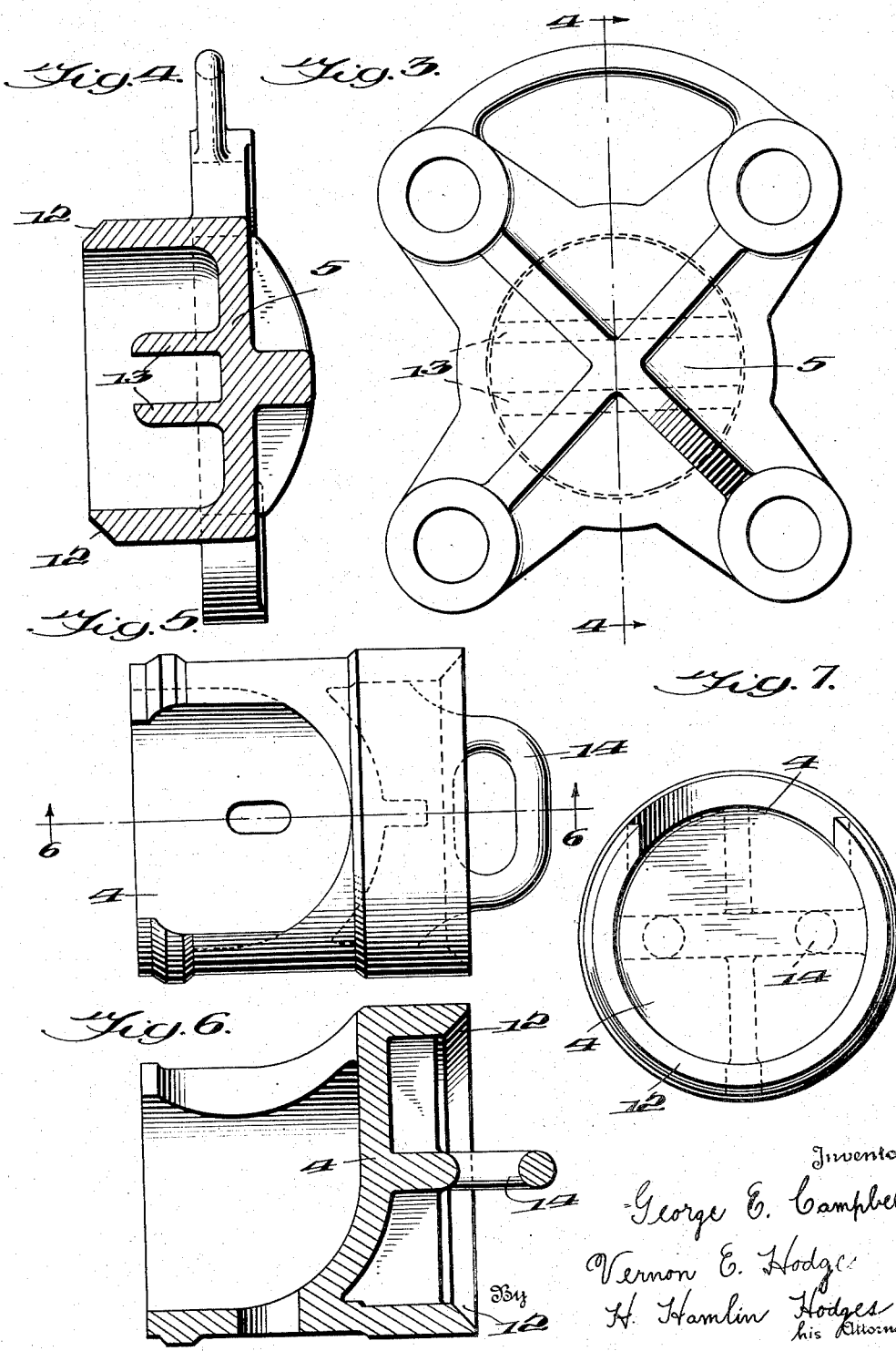

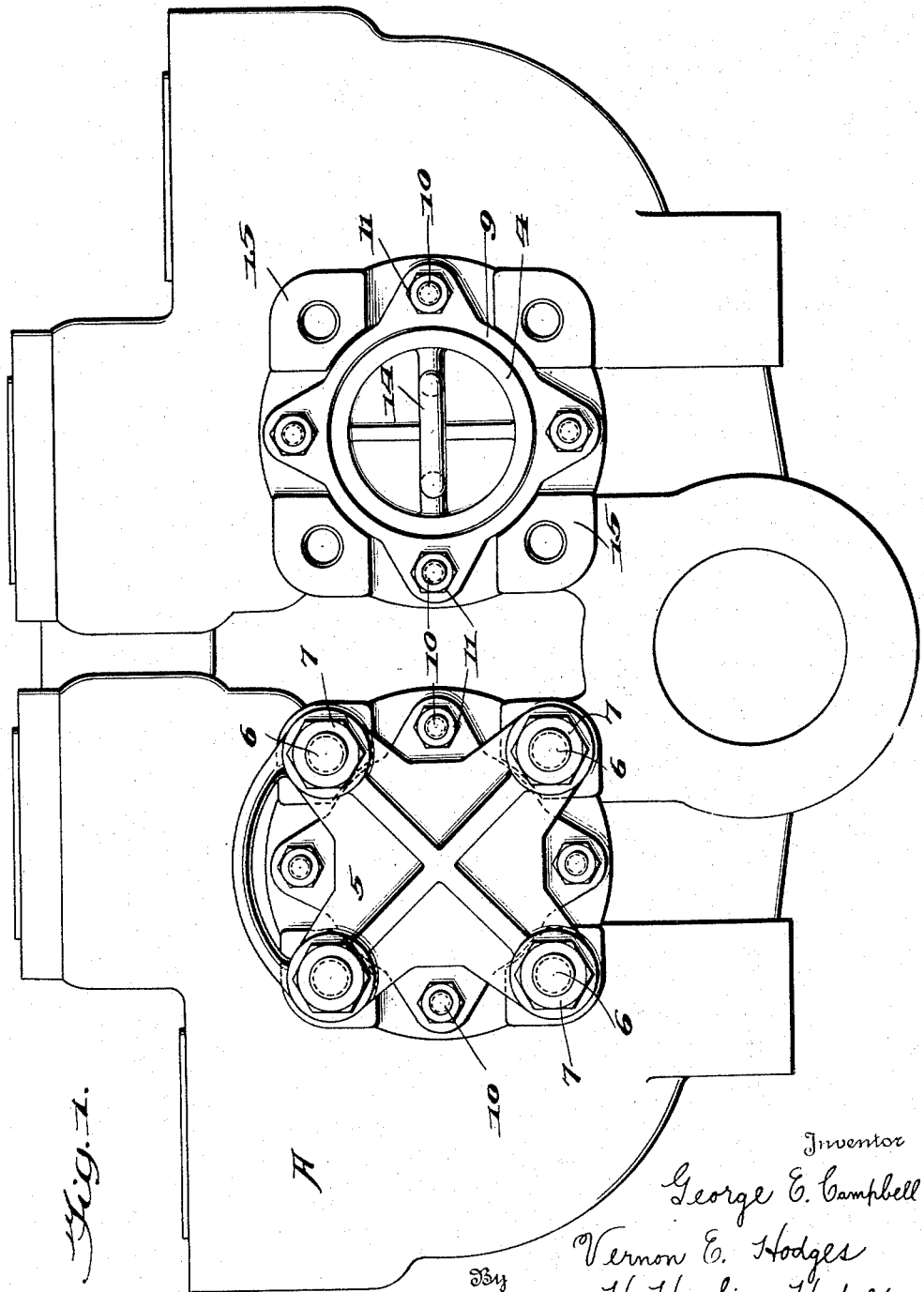

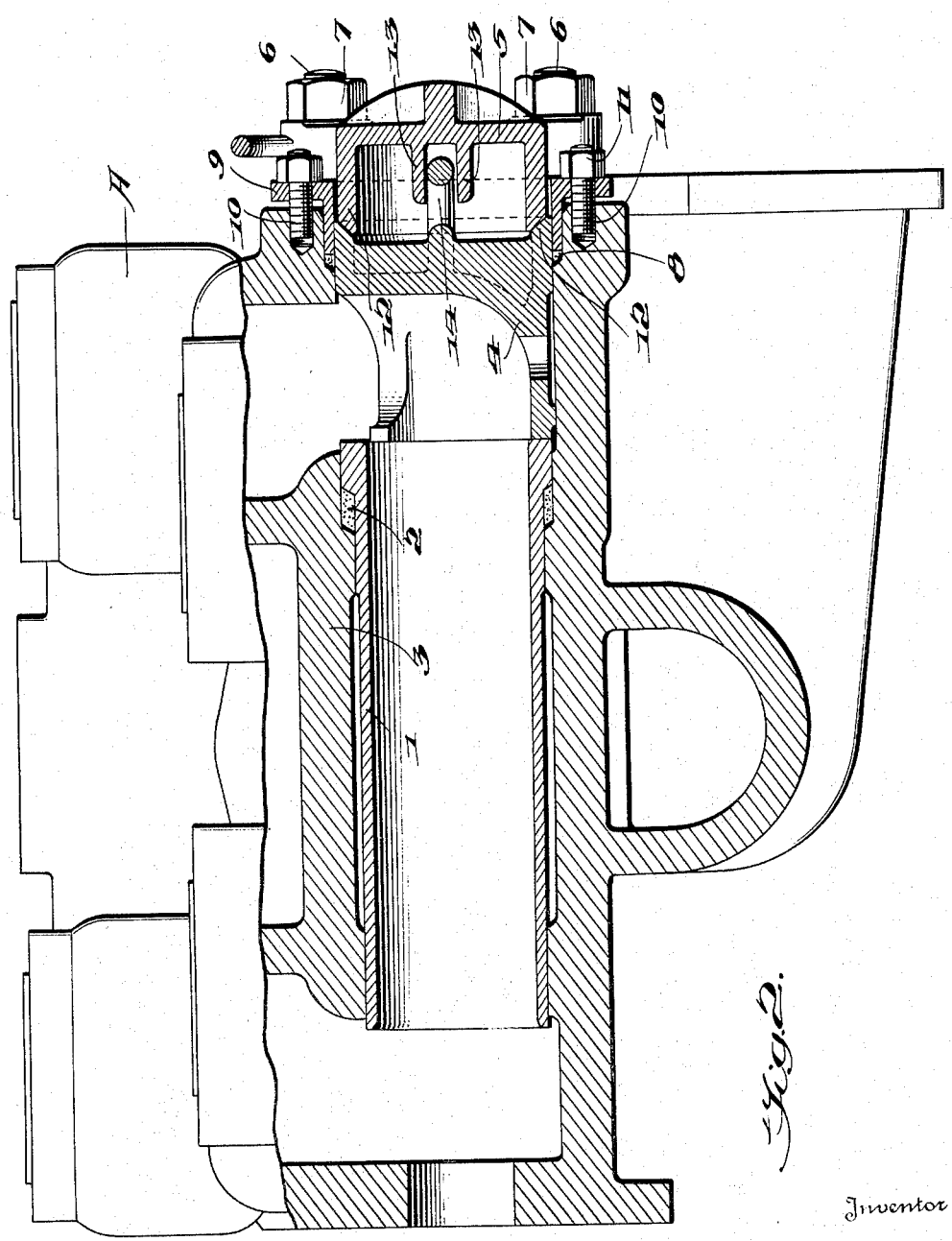

Patented Apr. 23, 1940

2,198,301

UNITED STATES PATENT OFFICE 2,198,301

WATER CYLINDER LINER RETAINER AND PACKING GLAND FOR PUMPS

George E. Campbell, Chattanooga, Tenn., assignor to The Wheland Company, Chattanooga, Tenn., a corporation of Tennessee Application October 14, 1937, Serial No. 169,038

5 Claims. (Cl. 309—3)

My invention relates to an improvement in water cylinder liner retainers and packing glands for pumps.

Heretofore, liners have been held tight against a packing by the use of adjusting screws which pass through a false head. These have been located inside of the cylinder structure where it is impossible to gain access to them without first removing the cylinder head. Also these parts have been entirely surrounded by the mud being pumped, and, consequently, are subject to rust and corrosion. In fact in actual practice it has frequently been necessary to cut these screws in two by means of a cutting torch in order to remove them.

The object of my invention is to obviate these difficulties, and with my assembly there are no screws inside the pump subjected to the fluid being pumped.

One of the primary objects of this present invention is to provide an assembly in which it is unnecessary to stop the pump, or to remove anything from the pump in order to tighten the liner packing, and likewise if and when it is desired to tighten the packing in the end of the cylinder, which may be done by tightening the screws which secure the gland in place, all from the outside of the assembly.

In the present construction, the various packings seal the mud in its proper course, and the assembly of all parts makes it possible to adjust either of the packings independently of each other from the outside of the cylinder since there are no screws within the mud course, and all screws and bolts are accessible from the exterior.

In the accompanying drawings:

Fig. 1 shows the complete assembly;

Fig. 2 is a view taken at right-angles to Fig. 1, partly in section and partly in elevation;

Fig. 3 is an enlarged view in front elevation of the cylinder head;

Fig. 4 is a section on the line 4—4 of Fig. 3, looking in the direction of the arrows;

Fig. 5 is an enlarged top plan view of the retainer;

Fig. 6 is a sectional view on the line 6—6 of Fig. 5, looking in the direction of the arrows; and Fig. 7 is an end view of the retainer.

Fig. 1 is an end view of the cylinder showing a complete assembly at the left, and at the right an end view of the cylinder with the head removed.

A, represents the pump of more or less typical type; and the numeral 1 represents a liner fitted within the cylinder. This liner is preferably just a cylindrical steel forging which is removable when worn out. A hydraulic packing ring 2 is inserted between the head of the liner and the wall of the cylinder 3 of the pump and prevents the passing of mud around the outside of the liner from one end of the cylinder to the other.

The liner 1 is held firmly against the packing-ring 2 by means of a liner retainer 4 which in turn is held in place by the cylinder head 5. This head is adjusted and tightened by the studs 6 and nuts 7 thereon.

Around the liner retainer 4, a hydraulic packing ring 8 is fitted. This packing ring is held tightly in place by the gland 9, and this gland is pulled tight by the smaller studs 10, of which there are preferably four which are located between the larger studs 6 at the left in Fig. 1.

The various packings shown seal the mud in its proper course, and the assembly of all parts makes it possible to adjust either of the packings 2 or 8 from the outside of the cylinder as there are no screws, studs or nuts within the mud course, and as illustrated in Figs. 1 and 2, these are all accessible from the outside of the end of the cylinder.

After this complete assembly is made, if it is found desirable to exert more pressure against the end of the liner 1, it can be done by tightening the four nuts 7 on the threaded studs 6 entirely independently of any other part. It is unnecessary to stop the pump or to remove anything from the pump in order to tighten the liner packing, and likewise if it is desired to tighten the packing 8 in the end of the cylinder, this can be done by tightening the nuts 11 on the ends of the screw studs 10 which screw the gland 9 in place.

It will be observed that the head 5 is not subjected to any water pressure. This virtually has the effect of a heavy clamp which holds the liner retainer 4 securely in place, and it is this liner retainer against which the water pressure comes. It will be observed that due to the divided construction of the liner retainer 4 and the cylinder head 5, a ball joint 12 is formed, so that if the operator should pull tighter on some of the studs 6 and nuts 7 than on others, it will still exert an equal and uniform pressure on the liner retainer 4.

A handle 14 on the liner retainer is adapted to fit roughly into a groove formed by parallel ribs 13 on the inner side of the cylinder head 5. This head is located by the lugs 15 and cannot be placed on properly unless this handle 14 registers between the ribs 13 as shown in Fig. 2. This insures that the liner retainer will always be put in the pump with the open side of the retainer at the top, as shown in Fig. 2, which, of course, is necessary for the proper circulation of the mud.

From the foregoing it will be seen that there are no studs, bolts, screws or nuts inside the pump to rust and corrode and to render difficult the disassembly of the parts; that all the adjustments of packings and other parts are accessible from the outside; and that it does not require the stoppage of the pump when access is had to them. All parts are simple, sturdy, easily applied or removed, and fit with precision when assembled.

I claim:

1. The combination of a cylinder, a liner, an independent liner retainer, and a head, the liner retainer and the head having a ball joint formation between them, means located outside of the cylinder for applying inward pressure directly upon the cylinder head, thence through the head to the liner retainer, and from the latter to the liner, a gland, a packing between the gland and a part of the cylinder and surrounding one end of the liner retainer, a packing between a portion of the liner and the cylinder, and means for tightening the gland, the tightening means for the head and the gland all located outside of the cylinder and arranged to alternate with one another.

2. The combination of a cylinder, a liner removable therein and fitted thereto, the cylinder and liner having spaced apart shoulders, a packing located in the space between said shoulders, a liner retainer fitted in the outer end of the cylinder in position to engage the liner, means outside of the cylinder for forcing the liner retainer against the liner whereby to move the latter endwise in the cylinder to exert pressure upon the packing between the shoulders of the cylinder and liner including a cylinder head, a gland secured to the outer end of the cylinder, a packing located at the outer end of the cylinder and extending around the liner retainer, the gland engaging the packing, and means connected with the end of the cylinder and gland for causing the latter to exert pressure upon said packing, the two means for exerting pressure upon the two packings being entirely independent of each other, and located in relatively close proximity to each other at the outer end of the cylinder.

3. The combination of a cylinder, a liner removable therein and fitted thereto, the cylinder and liner having spaced apart shoulders, a packing located in the space between said shoulders, a liner retainer fitted in the outer end of the cylinder in position to engage the liner, a cylinder head located at the outer end of the cylinder, and engaging the liner retainer, a gland surrounding a portion of the liner retainer, a packing extending around the liner retainer in position to be engaged by the gland, and two sets of studs entirely independent of each other for securing the cylinder head and the gland to the outer end of the cylinder and for exerting pressure on the two packings independently of each other.

4. The combination of a cylinder, a liner fitted therein at intervals, a packing ring between the cylinder and liner, a liner retainer fitted and movable in the outer end of the cylinder and engaging the liner, a cylinder head having a ball joint connection with the liner retainer, a gland, a packing in a recess formed between the cylinder, retainer and gland, and means for independently applying pressure to the two packings, and for rigidly securing the gland and cylinder head to the outer end of the cylinder.

5. The combination of a cylinder, a liner fitted therein at intervals, a packing ring between the cylinder and liner, a liner retainer fitted and movable in the outer end of the cylinder and engaging the liner, a cylinder head having a ball joint connection with the liner retainer, the liner retainer and cylinder head each having means for gaging the position of the cylinder head, a gland, a packing in a recess formed between the cylinder, retainer and gland, and means for independently applying pressure to the two packings, and for rigidly securing the gland and cylinder head to the outer end of the cylinder.

GEORGE E. CAMPBELL.